United States Patent [19]
Hollins

[11] 4,027,170
[45] May 31, 1977

[54] MOTOR VEHICLE EQUIPMENT

[76] Inventor: Jesse R. Hollins, 40 Stoner Ave., Great Neck, N.Y. 11021

[22] Filed: Oct. 1, 1975

[21] Appl. No.: 618,470

Related U.S. Application Data

[60] Continuation of Ser. No. 445,121, Feb. 25, 1975, Pat. No. 3,920,937, which is a division of Ser. No. 318,377, Dec. 26, 1972, Pat. No. 3,887,818.

[52] U.S. Cl. .......................... 307/10 R; 200/61.66
[51] Int. Cl.² ......................................... H01H 27/00
[58] Field of Search ............... 200/61.66, 44, 42 R; 307/10 R

[56]  References Cited
UNITED STATES PATENTS 2,613,258  10/1952  Azano ............................ 200/61.66
3,138,780  6/1964  Jacobsen ........................ 200/61.66
3,632,913  1/1972  Hukuta .......................... 200/61.66

Primary Examiner—Herman J. Hohauser
Attorney, Agent, or Firm—Kirschstein, Kirschstein, Ottinger & Frank

[57] ABSTRACT

An ignition switch including a key receiving lock cylinder. A pin is movable by the insertion of the key in the key receiving lock cylinder. A conducting switch leaf is connected to the hot terminal of a battery and is biased to touch a first contact of a two contact switch in the absence of any external force acting thereon. Insertion of the ignition key in the key receiving lock cylinder moves the pin so that the switch leaf is placed in contact with the second contact. When the key is removed from the key receiving lock cylinder, the switch leaf under its own resiliency moves and touches the first contact. Different circuits can be activated when the switch leaf is in circuit with either of the contacts.

3 Claims, 5 Drawing Figures

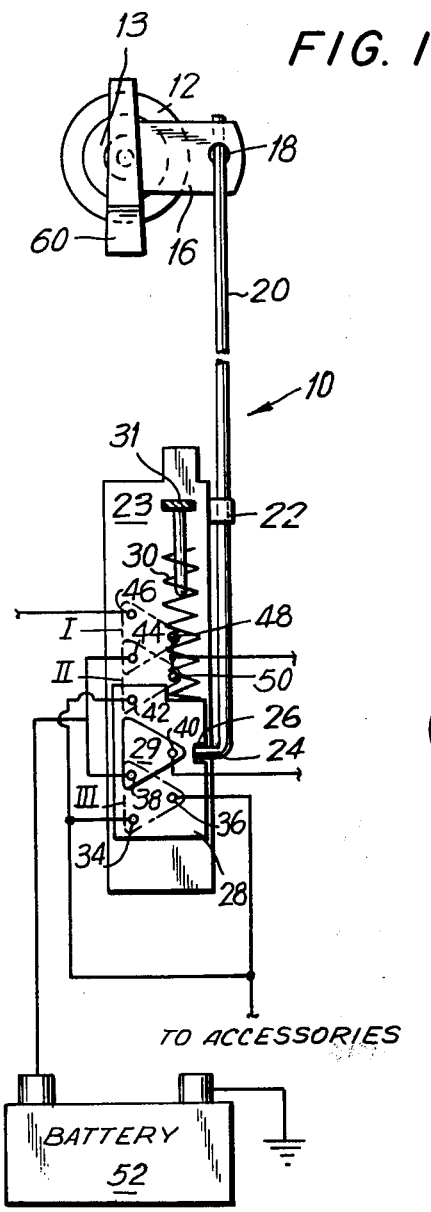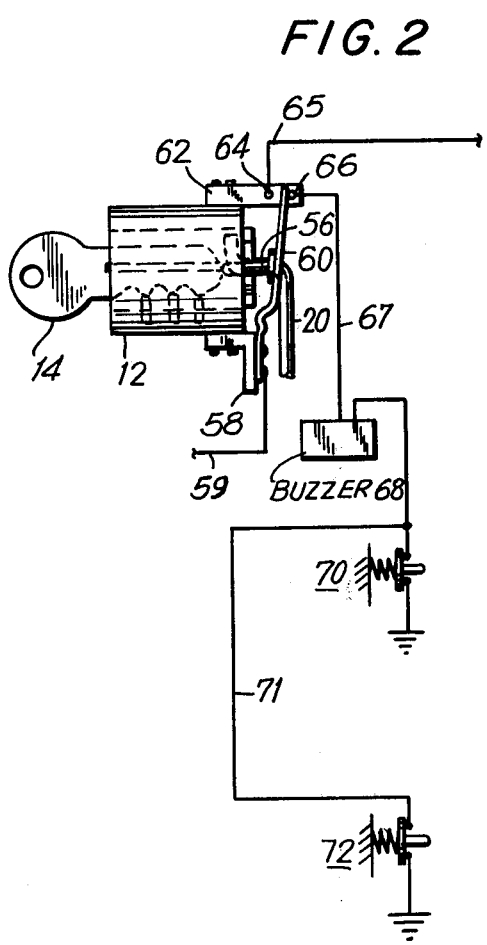

MOTOR VEHICLE EQUIPMENT

This is a continuation, of application Ser. No. 445,121 filed Feb. 25, 1975, now U.S. Pat. No. 3,920,937, issued Nov. 18, 1975; a division of application Ser. No. 318,377 filed Dec. 26, 1972 now U.S. Pat. No. 3,887,818 issued June 3, 1975.

CROSS REFERENCE TO RELATED APPLICATIONS

1. Patent application Ser. No. 189,650 filed Nov. 15, 1971 by Jesse R. Hollins for "MOTORIZED RETRACTABLE PADDED CUSHION".

2. Patent application Ser. No. 196,274 filed Nov. 8, 1971 by Jesse R. Hollins for "APPARATUS FOR AUTOMATICALLY EXTINGUISHNG VEHICULAR LIGHTS".

3. Patent application Ser. No. 303,495 filed Nov. 3, 1972 by Jesse R. Hollins for "VEHICLE SEAT BELT STARTER MOTOR INTERLOCK AND SEQUENTIAL WARNING SYSTEM".

BACKGROUND OF THE INVENTION

1. Field of the Invention

Motor vehicle equipment

2. Description of the Prior Art

In patent application Ser. No. 189,650 filed Nov. 15, 1971 by Jesse R. Hollins for "MOTORIZED RETRACTABLE PADDED CUSHION", an assembly for protecting a passenger of a vehicle is disclosed. The assembly includes a padded cushion which is guided between an extended horizontal position and a retracted position. In the extended position the padded cushion is located between passengers sitting of the front seal of the motor vehicle and the dashboard so as to prevent the passengers from hitting the dashboard or windshield during an accident or sudden stop. In the retracted position, the padded cushion is withdrawn so that the same does not interfere with passengers entering the vehicle or exiting from the front seat of the vehicle. A motor is provided for controlling the position of the padded cushion and the padded cushion is in its extended position when the ignition switch is in the ignition "ON" position. A switch "OFF" contact is provided at the switch "OFF" position of the ignition switch and when the ignition switch is placed in this position so that the motor vehicle engine is off the motor is activated so as to retract the padded cushion.

In patent application Ser. No. 196,274 filed Nov. 8, 1971 by Jesse R. Hollins for "APPARATUS FOR AUTOMATICALLY EXTINGUISHNG VEHICULAR LIGHTS", apparatus is disclosed for automatically extinguishing lights of a motor vehicle when the engine is shut off. The apparatus includes an ignition switch having an ignition "ON" contact and a switch "OFF" contact. A light control switch is provided for turning the lights of the vehicle on and off. Means automatically moves the light control switch to an "OFF" position for extinguishing the lights and electric circuit means coupled to the switch "OFF" contact connects said contact to the automatic moving means whereby when the ignition switch is placed in the switch "OFF" position and the ignition switch pole connects the switch "OFF" contact to the motor vehicle battery the motor vehicle lights are automatically extinguished.

In patent application Ser. No. 303,495 filed Nov. 3, 1972 by Jesse R. Hollins for "VEHICLE SEAT BELT STARTER MOTOR INTERLOCK AND SEQUENTIAL WARNING SYSTEM", a system is disclosed wherein, inter alia, a warning device is activated if the ignition switch is in the "ON" position and a seat belt is retracted and if the ignition switch is in the switch "OFF" position and a seat belt is extended. The system includes circuitry connected to the switch "OFF" contact of the ignition switch for activating the warning device when a seat belt is extended and the ignition switch is in the switch "OFF" position.

SUMMARY OF THE INVENTION

1. Purposes of the Invention

It is an object of the present invention to provide improved motor vehicle equipment.

Another object of the present invention is to provide an improved switch for sensing when a motor vehicle engine is off and the ignition key is in the key receiving lock cylinder.

Another object of the present invention is to provide an improved switch for sensing when a motor vehicle engine is off and the ignition key is in the key receiving lock cylinder and when the ignition key is out of the key receiving lock cylinder for use with the inventions disclosed in the three above-noted copending patent applications and for improving the functioning of the same.

Other objects in part will be obvious and in part will be hereinafter pointed out.

2. Brief Description of the Invention

According to one aspect of the present invention, the foregoing and other objects are achieved by a switch means which consists of a conducting spring switch leaf connected to a motor vehicle battery and a first contact and second contact. Means places the spring switch leaf in circuit with the second contact when the ignition key is in the key receiving lock cylinder the inherent bias of the spring switch leaf moves the same into circuit with the first contact. The first contact may be connected to any circuitry which is to be activated upon the ignition key being withdrawn from the key receiving lock cylinder.

The invention accordingly consists in the features of construction, combination of elements, and arrangement of parts which will be exemplified in the motor vehicle equipment hereinafter described and of which the scope of application will be indicated in the appended claims.

BRIEF DESCRIPTION OF THE DRAWINGS

In the drawings:

FIG. 1 is a schematic illustration of a first embodiment of the present invention;

FIG. 2 is a side plan view of the key and lock switch arrangement shown in FIG. 1 connected to a motor vehicle open door warning system;

DESCRIPTION OF THE PREFERRED EMBODIMENTS

Figure 3:
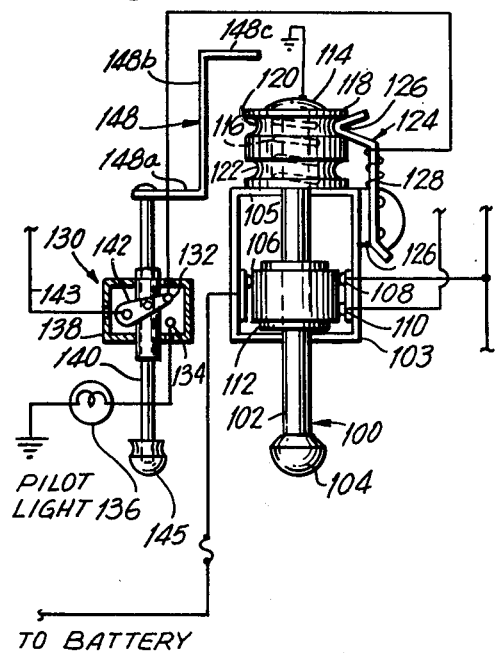
FIG. 3 is a schematic illustration of a headlight extinguishing apparatus for use with the key and lock switch arrangement shown in FIGS. 1 and 2.

In FIGS. 1 and 2 of the drawings a system 10 for use on a motor vehicle is illustrated and includes a key receiving lock cylinder 12 which receives ignition key 14 in the conventional manner. Key receiving lock cylinder 12 includes a rotatable internal sleeve 13. Rotatable with sleeve 13 is a link 16 having an opening 18 extending therethrough. A rod 20 extends through opening 18 and is of a smaller diameter than said opening. The upper portion of rod 20 is affixed to link 16 so as to move with the link as sleeve 13 is rotated. This can be accomplished by having the upper portion of rod 20 moved by abutment with link 16 or by any other conventional means. The means for securing cylinder 12 are not shown being conventional.

A guide 22 fixed to stationary switch housing 23 includes an opening through which rod 20 extends. The opening in guide 22 is slightly larger than rod 20. The lower portion of rod 20 includes a turned in end 24 which extends into a notch 26 of a movable insulator block 28. A biasing means 30 consisting of a compression spring includes two ends with one end in contact with the upper portion of block 28. The other end cooperates with a cimbined spring stop and guide pin is affixed to housing 23. Guide means is provided for allowing block 28 to move relative to switch housing 23 only in a vertical direction with respect thereto.

Located on switch housing 23 are contacts 34, 36, 38, 40, 42, 44, 46, 48 and 50. Contacts 34, 38, 42, 44 and 46 are in alignment with each other as are contacts 36, 40, 50 and 48. A conductive bridge connects contacts 48 and 50 to each other. Contacts 38 and 44 are connected to each other and to the hot terminal of a battery 52. Contacts 42 and 34 are connected to each other and to the motor vehicle accessories. Contact 36 is likewise connected to the motor vehicle accessories. Contact 46 is connected to the engine cranking motor solenoid while contacts 48 and 50 are connected to the motor vehicle ignition.

Movable block 28 includes a triangularly-shaped conductor 29 which cooperates with the switch housing contacts as will hereinafter be described. Conductor 29 is spring loaded to be in contact with the switch housing contacts in the conventional way.

Extending through the rear face of key receiving cylinder 12 is an opening through which an insulated pin 56 extends. Said pin extends into sleeve 13. A flange is located on the end of pin 56 outside sleeve 13 to prevent the pin from being pushed completely into sleeve 13 and with pin 56 abuts switch leaf 60. An L-shaped non-conductive bracket 58 is affixed to the bottom of key receiving lock cylinder 12. Affixed to the vertical portion of bracket 58 is the bottom of a conducting spring switch leaf 60. The means of securing the bottom of spring switch leaf 60 to bracket 58 can be conventional and said spring switch leaf is connected by a wire 59 to the hot terminal of battery 52. Secured to the upper portion of key receiving lock cylinder 12 is in insulated plate 62 with there being contacts 64 and 66 located thereon. Spring switch leaf 60 is biased to be in circuit with contact 64 in the absence of any external force acting thereon. When key 14 is placed in sleeve 13 of key receiving lock cylinder 12, the key abuts pin 56 so that spring switch leaf 60 is moved and touches contact 66. It is not necessary for ignition key 14 to be rotated relative to key receiving lock cylinder 12 to cause pin 56 to move spring switch leaf 60 to touch contact 66. A wire 65 is connected to contact 64 while a wire 67 is connected to contact 66 and to one contact of a warning device 68 which may consist of a buzzer. The remaining contact of warning device 68 is connected to a switch 70 which is grounded.

If desired, switch leaf 60 may include a sound producing means which is grounded when any vehicle door is open so that the need for a warning device is eliminated.

Switch 70 is closed when one of the motor vehicle doors is open and is open when said door is closed. A wire 71 places switch 72 in parallel with warning device 68 and switch 70. Switch 72 is identical to switch 70 and is grounded. Switch 72 is controlled by one of the remaining doors on the motor vehicle and is closed when the door is open and open when the door is closed. For a two-door vehicle, switch 70 would be for one door and switch 72 for another door. Four four-door vehicles, four of such switches would be utilized with one switch for each door with each switch connected to warning device 68 and circuit ground.

With ignition key 14 out of key receiving lock cylinder 12, spring switch leaf 60 touches contact 64. With the insertion of ignition key 14 into key receiving lock cylinder 12, pin 56 is abutted by said key and moves away from said cylinder so that spring switch leaf 60 moves into circuit with contact 66. If either of the doors associated with switches 70 or 72 are open, said switches are closed grounding warning device 68 so that the same is activated. If the doors associated with switches 70 and 72 are closed, both of said switches are open and warning device 68 remains inactive.

When ignition key 14 is in key receiving lock cylinder 12 and the ignition switch is in the switch "OFF" position, block 28 is positioned with conductor 29 as shown in solid lines so that battery 52 is in circuit with contact 40.

Rotation of ignition key 14 in key receiving lock cylinder 12 to the engine cranking motor position results in link 16 rotating in a counter clockwise direction as viewed in FIG. 1 and pulling rod 20 in an upwards direction. As a consequence thereof, block 28 is moved to its most elevated position and conductor 29 is in the dotted triangle position identified by Roman numeral I. The upper end of spring 30 which always surrounds the pin now abuts the stop and the spring is placed under compression. With conductor 29 in the position identified by Roman numeral I, electrical energy is directed to terminal 46 and to the engine cranking motor solenoid. In addition, conductor 29 spans terminals 44 and 48 so that the ignition is in circuit with battery 52.

After the engine begins to run, the vehicle operator no longer maintains a force on ignition key 14 and the bias of spring 30 causes block 28 to move so that conductor 29 is in the position shown by the dotted triangle identified by Roman numeral II. In this position there is no electrical energy directed to contact 46 and the engine cranking ceases. Conductor 29 spans contacts 42, 44 and 50 and as a consequence thereof the ignition is in circuit with battery 52. Contact 42 which leads to the accessories is in circuit with battery 52 so that the accessories are supplied with electrical energy. The upper end of spring 30 is spaced from or in light contact with the stop so as not to exert any force on plate 28 while surrounding the pin.

When it is desired to have the ignition switch in the accessories only position, ignition key 14 is rotated a maximum amount so that conductor 29 is in the position shown in dotted lines identified by Roman numeral III. Here, conductor 29 spans contacts 34 and 36 so that the accessories are in circuit with battery 52.

The structure for locking the steering column when the ignition key is removed from the key receiving lock cylinder is not shown in view of it being conventional. 92 In FIG. 3 of the drawings, apparatus for automatically extinguishing headlights is disclosed which functions substantially in the same way that the different embodiments of my copending patent application Ser. No. 196,274 function. In FIG. 3 a headlight control switch 100 is disclosed and includes a shaft 102 with a knob 104 on the end thereof. A headlight switch housing 103 is provided and located therein is a hot contact 106 which is in circuit with the motor vehicle battery hot contact. Hot contact 106 is insulatedly mounted in housing 103 as are contacts 108 and 110. Secured to shaft 102 inside housing 104 by insulating means is a conducting member 112 which in the position shown in FIG. 3 places contacts 108 and 110 in circuit with contact 106. By appropriately positioning shaft 102, conducting member 112 can be positioned so as to span contacts 106 and 108 only. Contact 110 is connected to the motor vehicle headlights whereas contact 108 is connected to the remaining lights of the vehicle such as the tail lights, parking lights, etc.

Shaft 102 extends through end 105 of housing 103 and located at the end of the portion of said shaft which extends through end 105 is a conducting head 114. A flexible lead connects head 114 to circuit ground so the switch shaft is grounded. Shaft 102 is spring loaded by a compression spring 116 located between housing end 105 and head 114 which surrounds the portion of shaft 102 adjacent end 105 but outside of housing 103.

A conducting latch receiving member 118 is positioned about shaft 102 and abuts head 114. Latch receiving member 118 includes a channel in which spring 116 is received. Latch receiving member 118 has recesses 120 and 122 located along the outside surface thereof.

A conducting arm latcher 124 has one end fastened to housing 103 but electrically insulated therefrom by insulating member 126. The other end of arm latcher 124 includes a protrusion 126 which is shaped so as to extend into either of recesses 120 or 122. When protrusion 126 is received in recess 120 all the vehicle lights are on, whereas when protrusion 126 is received in recess 122 the parking lights, tail lights, etc. are on. When protrusion 126 is received in either of the recesses of latch receiving member 118, the force exerted by said protrusion on said member is sufficient to overcome the bias of spring 116 so as to maintain the spring in a compressed condition. Location of protrusion 126 in either of recesses 120 or 122 does not prevent the motor vehicle operator from positioning shaft 102 by applying an appropriate force to knob 104.

The portion of arm latcher 124 from which protrusion 126 extends is bimetallic and located thereabout is a heating coil 128. Heating coil 128 includes two contacts with one of said contacts being connected to arm latcher 124. The remaining contact of heating coil 128 is connected to a switch 130 and specifically to contact 132 thereof. Switch 130 includes a further contact 134 with contact 134 connected to a pilot light 136 which is connected to circuit ground. Contacts 132 and 134 are located in a switch housing 138 and slideable therethrough is a rod 140. A conducting contact arm 142 is provided and is connected to a wire 143. Contact arm 142 is affixed at one end to housing 138 and is movable with shaft 140 to a first position in which it touches contact 132 and to a second position in which it touches contact 134. A knob 145 is affixed to shaft 140 for manually controlling the position thereof.

Secured to the portion of shaft 140 furthest from knob 145 is a control member 148 which includes sections 148a, 148b and 148c. Sections 148a and 148c are parallel to each other and perpendicular to section 148b which extends between sections 148a and 148c. Section 148a is the portion of the control member 148 which is affixed to shaft 140. Section 148c of member 148 is of sufficient dimension so as to partially overlay member 118.

The apparatus shown in FIG. 3 is for use with the key and lock arrangement shown in FIGS. 1 and 2 and wire 143 is connected to contact 64.

If the motor vehicle operator wishes to have the headlights on with the motor vehicle engine in operation, shaft 102 is placed in the position seen in FIG. 3 so that contacts 108 and 110 are in circuit with hot contact 106. Protrusion 126 is received in recess 120 for this orientation of shaft 102. If the motor vehicle operator turns ignition key 14 to the switch "OFF" position and removes the key from key receiving lock cylinder 12, wire 143 is connected through contact 64 to the vehicle battery. Coil 128 via switch 130 is placed in circuit with battery 52 and is grounded through member 118. The coil generates heat which after a passage of time causes the bimetallic portion of arm latcher 124 to flex so that protrusion 126 is no longer received in recess 120. When this occurs, spring 116 expands until member 112 abuts end 105 of housing 104 thereby moving member 112 to a position so that contacts 108 and 110 are no longer in circuit with hot contact 106 and the motor vehicle lights are extinguished. Protrusion 126 is no longer in contact with member 118 and coil 128 is no longer grounded.

If the motor vehicle operator wishes to take the ignition key out of the ignition and still leave the headlights on, knob 145 is pulled until arm 142 is moved so as to no longer touch contact 132 but instead touch contact 134. Thus with shaft 140 positioned as aforedescribed and the ignition key out of the key receiving lock cylinder, there is no electrical energy supplied to coil 128 and the vehicle lights remain on. Manual turning off of the heatlights causes head 114 to abut section 148c moving the same so that arm 142 contacts contact 132.

If the vehicle operator wishes the lights to remain on with the engine off and the ignition key in the key receiving lock cylinder for as long as the key is located therein, shaft 140 is positioned as shown in FIG. 3. With the ignition key received in the key receiving lock cylinder, pin 56 maintains spring switch leaf 60 in contact with contact 66 and no electrical energy is supplied to coil 128. Accordingly, protrusion 126 is maintained in recess 120 of member 118 and the lights remain on. As soon as the ignition key 14 is removed from the key receiving lock cylinder, electrical energy is supplied to contact 64 and via said contact to coil 128 so that the lights are automatically extinguished as aforedescribed.

Thus it will be seen that by maintaining the ignition key in the key receiving lock cylinder in the switch "OFF" position the apparatus for extinguishing the vehicle lights is inoperative and becomes operative when the ignition key is removed from the key receiving lock cylinder.

Figure 4:
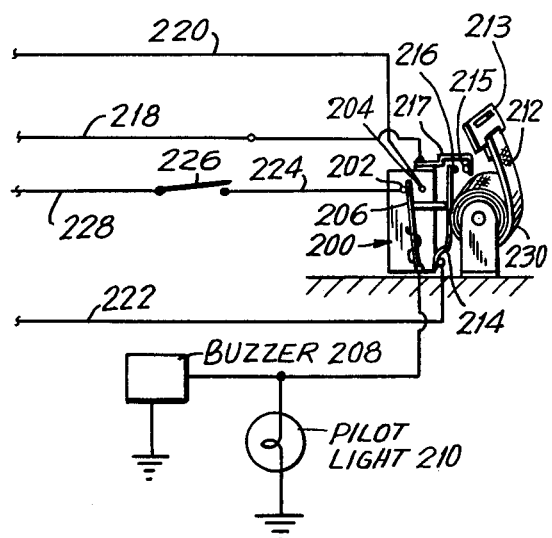
FIG. 4 is a schematic illustration of a seat belt warning and interlocking system for use with the key and lock switch arrangement shown in FIGS. 1 and 2.

In FIG. 4 of the drawings a vehicle seat belt starter motor interlock and sequential warning system is disclosed of the type set forth in my copending patent application Ser. No. 303,495. The system of FIG. 4 includes a switch means 200 which is a snap action single pole double throw switch. Switch means 200 includes contacts 202 and 204. In addition, switch means 200 includes a movable arm 206 which is spring biased so that in the absence of any external force acting thereon said arm touches contact 204. Movable arm 206 is connected to one contact of a warning device 208 with the remaining contact of said warning device connected to circuit ground. Also electrically connected to movable arm 206 is a pilot light 210 which is likewise connected to circuit ground.

A retractable driver seat belt 212 having a buckle half 213 is provided. A conducting cantilever switch leaf 214 includes a contact 216 at the upper portion thereof. A fixed contact 215 is affixed to a conducting member 217 with a wire 218 connected to said member. Switch means 200 includes a non-conducting push button which is fixed to movable arm 206 and bears against cantilever switch leaf 214 in a manner that will hereinafter be described.

A wire 220 is connected to contact 204 and a wire 222 is connected to cantilever switch leaf 214. A wire 224 is connected to contact 202 and a load responsive switch 226 which is located in the driver side of the vehicle front seat and is closed when the driver is sitting thereon and is open at all other times. Connected to load responsive switch 226 is a wire 228. Wire 222 is connected to contact 46, wire 228 is connected to contact 50 while wire 220 is connected to contact 64. Wire 218 is connected to the vehicle engine cranking motor solenoid.

Seat belt retraction sensing means is provided by a spiral 230 with cantilever switch leaf 214 always bearing thereagainst. When seat belt 212 is retracted, the spiral increases in size so that cantilever switch leaf 214 moves to a position so that contacts 215 and 216 are spaced from each other and movable arm 206 touches contact 202. When seat belt 212 is extended, spiral 230 decreases in size and the inherent bias of movable arm 206 brings the arm in contact with contact 204 while the switch means push button moves cantilever switch leaf 214 so that contacts 215 and 216 touch.

If key 14 is out of key receiving lock cylinder 12 and seat belt 212 is extended, warning device 208 will be activated and pilot light 210 will be lit. This is because under the foregoing conditions battery 52 will be placed in circuit via wire 220 contact 204 and movable arm 206 with warning device 208 and pilot light 210. Retraction of seat belt 212 increases the size of spiral 230 so that movable arm 206 touches contact 202 and electrical energy is no longer directed to warning device 208 and pilot light 210.

Insertion of ignition key 14 in key receiving lock cylinder 12 causes spring switch leaf 60 to touch contact 66. If ignition key 14 is in the switch "OFF" position, that is, conductor 29 is in the position seen in solid lines in FIG. 1, warning device 208 and pilot light 210 will not be activated despite seat belt 212 being extended since contact 64 is isolated from battery 52.

If seat belt 212 is retracted and ignition key 14 is rotated so that conductor 29 is in the dotted line position identified by Roman numeral I, contact 46 will be placed in circuit with battery 52. However, with seat belt 212 retracted contacts 215 and 216 will be spaced from each other and no electrical energy will be supplied to wire 218 and to the engine cranking motor solenoid. Additionally, with the driver sitting on the driver side of the front seat, switch 226 is closed, warning device 208 is activated and pilot light 210 is lit since movable arm 206 is in contact with contact 202 and wire 228 is in circuit with contacts 48 and 50.

As soon as seat belt 212 is extended, movable arm 206 touches contact 204 and contacts 215 and 216 touch each other. Accordingly, electrical energy is directed to the engine cranking motor solenoid and warning device 208 is deactivated and pilot light 210 is no longer lit. After the motor vehicle engine commences to run, ignition key 14 is allowed to rotate under the bias of spring 30 so that conductor 29 moves to the position shown in dotted lines and identified by Roman numeral II. As long as seat belt 212 is extended, warning device 208 will not be activated and pilot light 210 will not be lit.

If the motor vehicle operator moves ignition key 14 so that conductor 29 is in the position seen in solid lines in FIG. 1, the engine will no longer run. As long as ignition key 14 is in key receiving lock cylinder 12, warning device 208 will remain deactivated and pilot light 210 unlit irrespective of whether the seat belt is extended or retracted. This results from pin 56 holding spring switch leaf 60 in contact with contact 66 and out of contact with contact 64. Once ignition key 14 is removed from key receiving lock cylinder 12, spring switch leaf 60 touches contact 64 and if the seat belt is extended, warning device 208 is activated and pilot light 210 is lit. The retraction of seat belt 212 causes movable arm 206 to touch contact 202 deactivating warning device 208 and maintaining pilot light 210 unlit.

If desired, load switch 226 can be eliminated and contact 202 placed directly in circuit with terminal 50.

Figure 5:
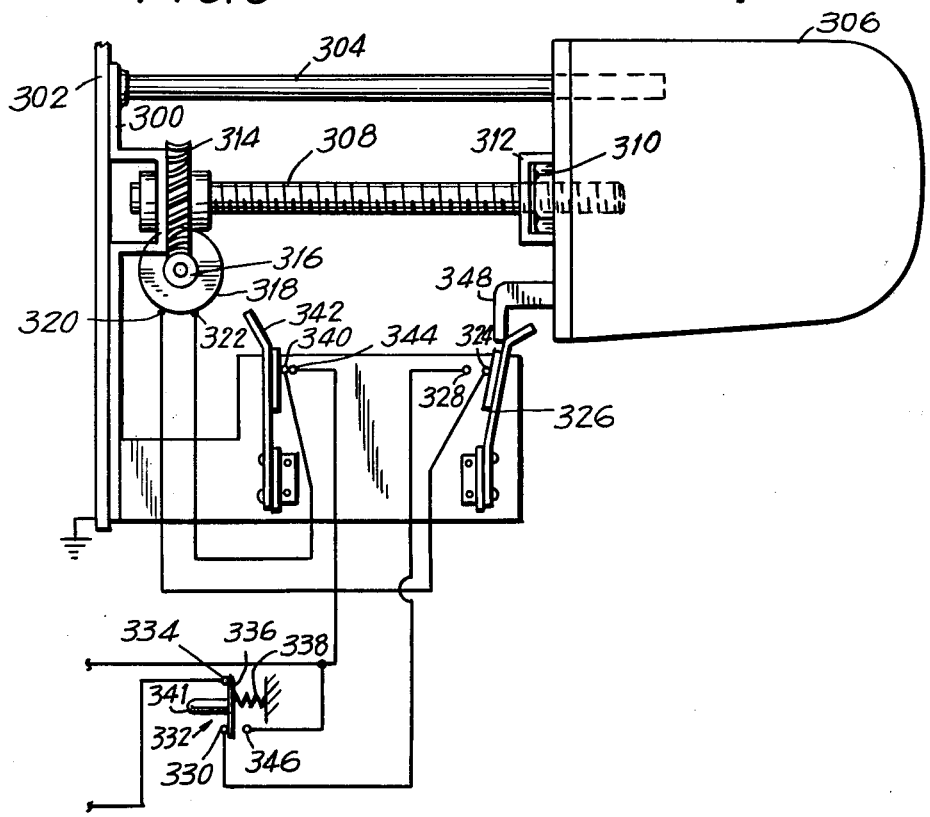
FIG. 5 is a schematic illustration of a motorized padded cushion apparatus for use with the key and lock switch arrangement shown in FIGS. 1 and 2.

In FIG. 5 of the drawings a support frame 300 is shown mounted to the fire wall 302 of a motor vehicle. Tubular members, of which one 304 is shown in the drawings, have one end secured to grounded support frame 300. Normally, two tubular members will be utilized with said tubular members being in registry with each other and spaced apart from each other. The ends of the tubular members not secured to frame 300 slideably extend through openings in cushion frame structure 306 which is located in front of passengers sitting on the front seat of a motor vehicle. Cushion frame structure 306 is surrounded by a suitable material such as foam rubber. A more detailed description of the cushion frame structure can be found in my copending patent application Ser. No. 189,650.

A portion of support frame 300 is spaced from fire wall 302. A threaded shaft 308 is provided and extends through the portion of support frame 300 spaced from fire wall 302 by suitable bearing means which supports said shaft while enabling the same to rotate relative to the support frame. The means of supporting threaded shaft 308 to enable the same to rotate relative to support frame 300 and be secured thereby can consist of having a collar secured to the threaded shaft and received in bearings mounted on the portion of support frame 300 spaced from fire wall 302. A nut 310 is in threaded engagement with shaft 308 and is prevented from rotating by a nut retainer 312 which spans the nut and is secured to cushion frame structure 306.

Rotatable with threaded shaft 308 is a worm wheel 314. A worm gear 316 is in mesh therewith and is rotated by an electric motor 318 which is grounded. Electric motor 318 includes contacts 320 and 322. When contact 320 is supplied with electrical energy the motor shaft rotates in one direction and when contact 322 is supplied with electrical energy the motor shaft rotates in the other direction. Electric motor contact 320 is connected to a contact 324 on switch arm 326. Switch arm 326 is biased to cause contact 324 to touch contact 328 absent any external force being applied thereto. Contact 328 is connected to a contact 330 of switch 332. Switch 332 includes a further contact 334. A contact plate 336 is pivotable and can make contact with either of contacts 330 and 346 while being permanently in circuit with contact 334. A compression spring acting on plate 336 maintains the plate normally in contact with contact 330. A push button 341 is connected to contact plate 336 for enabling the same to be moved against the bias of spring 338.

Motor contact 322 is connected to contact 340 of biased switch arm 342. Absent any external force acting on switch arm 342 the bias thereof maintains contact 340 in circuit with contact 344. Contact 344 is in circuit with contact 346. Depending downwardly from cushion frame 306 is an L-shaped limit control switch plate 348.

Contacts 346 and 344 are connected to contact 64 while contact 334 is connected to contact 48.

When the motor vehicle operator enters the motor vehicle, cushion frame 306 will be in its retracted position beneath the instrument panel of the motor vehicle. Limit control switch plate 348 prevents switch arm 342 from keeping contacts 340 and 344 in contact with each other. The bias of switch arm 326 maintains contacts 324 and 328 in contact with each other. Accordingly, passengers will be able to sit on the front seat of the motor vehicle without any interference from the cushion. When ignition key 14 is rotated in key receiving lock cylinder 12 to the engine cranking position and then to the ignition "ON" position, contact 48 and 50 are placed in circuit with battery 52 and electrical energy through contacts 334, plate 336, contact 330, contacts 324, 328 and 320 is connected to electrical motor 318 causing the same to rotate. Rotation of electrical motor 318 results in rotation of worm gear 316 and worm wheel 314 causing threaded shaft 308 to rotate. Floating nut 310 moves along threaded shaft 308 in a direction away from fire wall 302 so that the padded cushion is moved to an extended position and is in front of and in close proximity any passengers sitting on the front seat. When the padded cushion reaches its extended position, limit switch control plate 348 abuts switch arm 326 so that contacts 324 and 328 are spaced from each other. Accordingly, motor 318 ceases rotation. The padded cushion in its extended position protects any passengers sitting on the front seat from being thrown against the motor vehicle dashboard and wind shield during an accident or a sudden stop of the motor vehicle.

If the motor vehicle operator wishes to retract the padded cushion while the engine is running to enable passengers to enter or leave the vehicle with a minimum of effort, button 341 is depressed so that plate 336 touches contact 346 with the result that electrical energy is supplied to contact 322 causing motor 318 to rotate so that the padded cushion is retracted. The limit of retraction of the padded cushion is determined by the abutment of limit switch control plate 348 and switch arm 342 since when this occurs contact between contacts 340 and 344 is broken. When the motor vehicle operator wishes to extend the padded cushion, pressure is released from push button 341 and electrical energy is directed to contact 320 via contacts 324 and 328 causing the padded cushion to extend as previously described.

If the motor vehicle operator wishes to turn the engine off but keep the padded cushion extended, ignition key 314 is rotated so that conductor 29 is in the switch "OFF" position shown in solid lines in FIG. 1. Since the ignition key is still in the key receiving lock cylinder, pin 56 prevents spring switch leaf 60 from moving into contact with contact 64 and the padded cushion remains extended. When the key is removed from the key receiving lock cylinder, spring switch leaf 60 moves into contact with contact 64 and the cushion is retracted since contact 344 is now placed in circuit with the vehicle battery.

By connecting the embodiments of FIG. 3 through 5 to contact 64 a selective delay is introduced into the embodiments improving their performance.

It thus will be seen that there is provided motor vehicle equipment which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. A motor vehicle ignition switch comprising an ignition key receiving lock cylinder adapted to receive an ignition key, a conducting arm insulatably mounted to said lock cylinder, means connecting said conducting arm in circuit with a source of electrical energy, a conducting arm mover element responsive to the position of said ignition key within said ignition key receiving lock cylinder, a first switch contact, a first electrically energizable motor vehicle accessory, means placing said first electrically energizable motor vehicle accessory in circuit with said first switch contact, a second switch contact, a second electrically energizable motor vehicle accessory, means for placing said second electrically energizable motor vehicle accessory in circuit with said second switch contact, said conducting arm biased to engage said second switch contact when said ignition key is not positioned in said ignition key receiving lock cylinder so that said second electrically energizable motor vehicle accessory is energized by said source of electrical energy through said conducting arm and said second switch contact, said conducting arm mover element adapted to urge said conducting arm into contact with said first switch contact when said ignition key is positioned in said ignition key receiving lock cylinder so that said first electrically energizable motor vehicle accessory can be energized by said source of electrical energy through said conducting arm and said first switch contact.

2. The motor vehicle ignition switch according to claim 1 wherein said ignition key receiving lock cylinder is provided with an end face, said conducting arm mover element extending into said key receiving lock cylinder through said end face so that upon the insertion of said ignition key in said key receiving lock cylinder said ignition key abuts said conducting arm mover element causing said conducting arm to move from said second switch contact and to touch said first switch contact.

3. The motor vehicle ignition switch according to claim 1 further including a stationary switch housing, a movable block, means for moving said block as said ignition key receiving lock cylinder is rotated at any one of four different positions, said movable block having a conducting member thereon, said switch housing having an engine starter motor contact, an ignition contact, an accessories contact and a switch "OFF" contact, said conducting member being placed in circuit with said engine starting motor contact and said ignition "ON" contact for a first position of said key receiving lock cylinder, in circuit with said ignition "ON" contact and said accessories contact for a second position of said ignition key in said key receiving lock cylinder, in circuit with said switch "OFF" contact for a third position of said key and in circuit with said accessories contact for a fourth position of said ignition key.

* * * * *